UNITED STATES PATENT OFFICE.

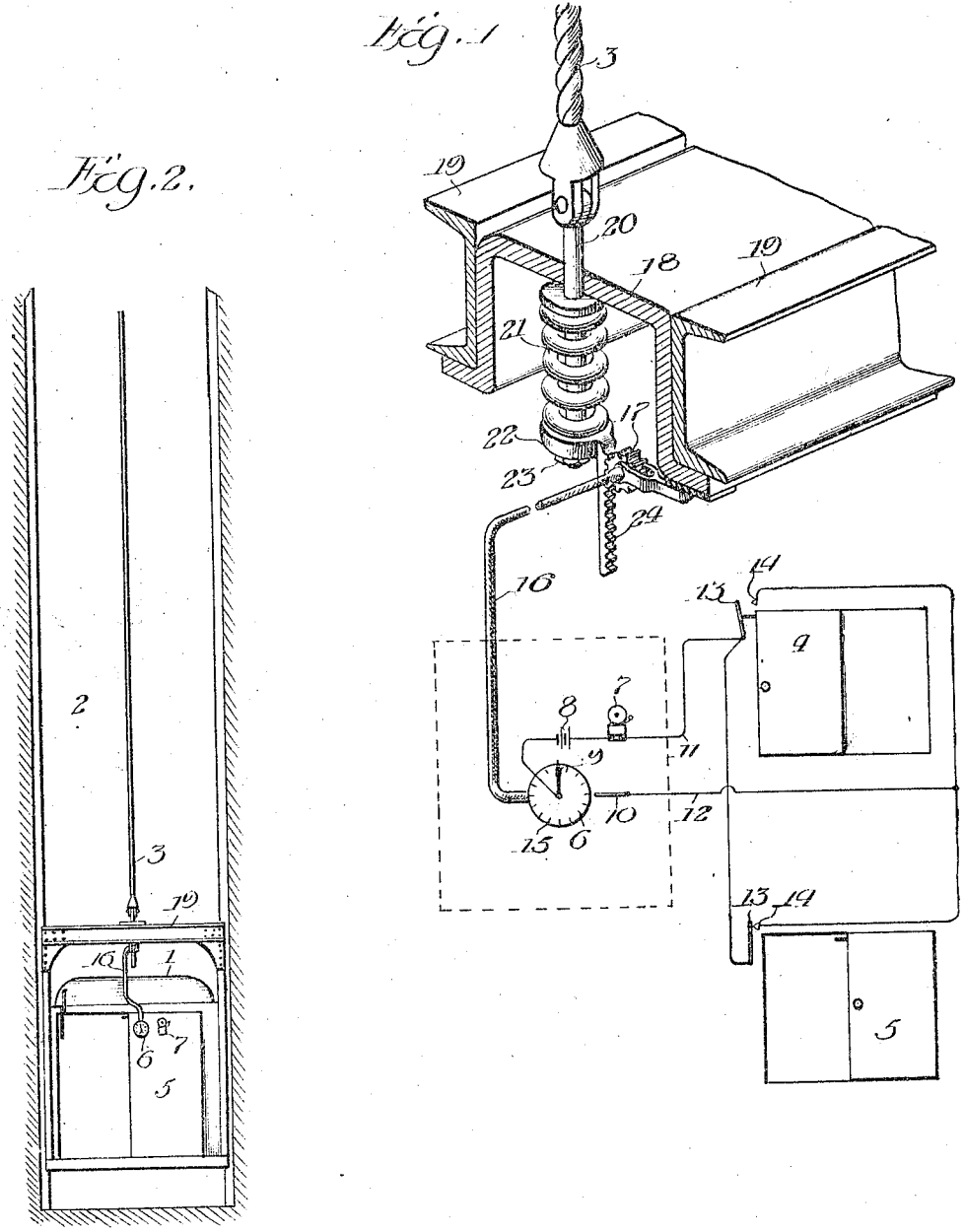

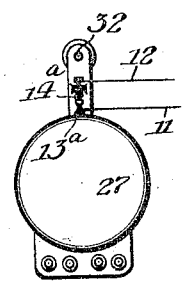
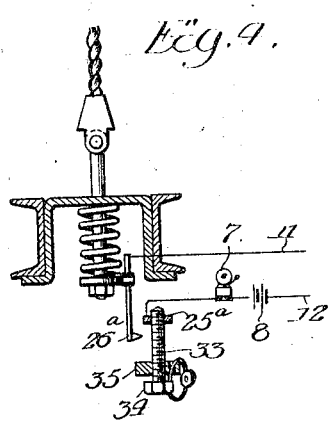
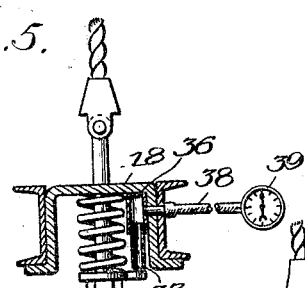
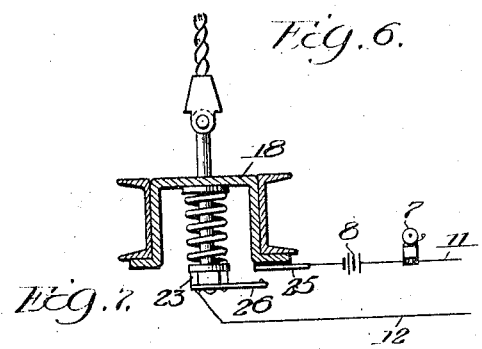
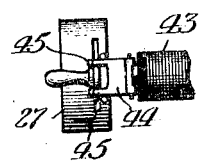
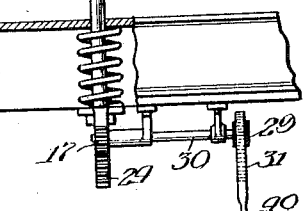
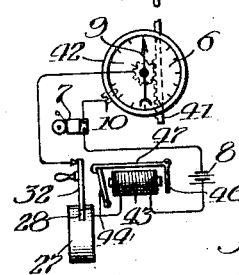

JOHN C. A. ANDERSON, OF CHICAGO, ILLINOIS.

ELEVATOR-ALARM.

1,061,514.     Specification of Letters Patent.     Patented May 13, 1913.

Application filed November 7, 1911. Serial No. 658,964.

*To all whom it may concern:*

Be it known that I, JOHN C. A. ANDERSON, a citizen of the United States, residing at Chicago, in the county of Cook and State of Illinois, have invented a certain new and useful Improvement in Elevator-Alarms, of which the following is a full, clear, concise, and exact description, reference being had to the accompanying drawings forming a part of this specification.

My invention relates to elevator indicators and alarms, and has for its general object the provision of improved means to indicate the weight being carried by a movable platform such for instance as an elevator.

My invention is applicable to a great variety of uses, but I have selected for describing herein that particular embodiment of my invention which relates to elevators, and more particularly to passenger elevators, and I will specifically set forth my invention as so applied, without intending thereby to limit its application.

As applied to passenger elevators my invention contemplates the provision of indicating means which in some embodiments may be supplemented by alarm means to indicate the weight carried by the car, or if desired to give an alarm when the weight being carried by the car exceeds a predetermined amount. In some forms of the invention the alarm means of course may be employed solely, thereby to give notice when the weight within the car exceeds a predetermined amount.

In the operation of elevator cars it will be noted that the weight carried by the car may be a given amount. If an indicator were provided to register this weight, the indicator in all probability would show an indication usually exceeding this amount at the time the car starts and thus give an improper indication as the direct pull on the cables is naturally greater when the car is being started or being accelerated and is conversely less when the speed is being retarded or the car is being brought to a stop. Consequently in addition to the indicating means I have designed appliances whereby the alarm giving portion of the mechanism, or the indicating means also if desired, may give indications only when the car is standing still so that these indications or alarms will not be given while the car is in motion. These auxiliary controlling means may be operated in a number of different ways which would effect this result, but the one which I have preferred to illustrate herein comprises a controlling mechanism controlled by the position of the door which closes the entrance to the elevator shaft so that the indications may only be made as a particular door is opened and will not be made after the doors are all closed.

I will explain my invention more in detail by reference to the accompanying drawings illustrating one embodiment thereof with modifications, in which:

Figure 1 is a detail diagrammatic view illustrating my invention; Fig. 2 is a general view showing the general application. Fig. 3 is a modification whereby the controller also controls the indicator; Fig. 4 is a detail view showing the adjustability of the device; Fig. 5 is a modification; Fig. 6 is a simplified form of the apparatus set forth in Fig. 1, and: Figs. 7 and 8 are detail views whereby the car controlling mechanism may be rendered operative or inoperative.

Referring more particularly to Fig. 2, I show an elevator car 1 within a shaft 2, which car is supported by means of cables 3. Doors 4 and 5 are shown which close the entrance to the shaft or hatch 2. Each elevator car is provided with an indicator 6 and an alarm 7. The alarm 7 receives its current preferably from a battery 8 and is controlled by the pointer 9 of the indicator 6 and the contact element 10. Circuit wires 11 and 12 lead from the electrical apparatus thus specified, the wire 11 being connected with contact springs 13, 13 and the wire 12 being connected with the stationary contacts 14, 14. The door 4 is shown as closed and the door 5 as open in the diagrammatic sketch of Fig. 1. Thus when the door 4 is closed the contact between elements 13 and 14 is open and when all the doors are closed and the car 1 is ready to start then the alarm circuit is open. When however, any door such as 5 is open the alarm circuit is closed and thus the registrations and alarms are given as the load is being placed upon or taken off the said car. After all the weight has been placed on the car or taken off and the door closed preparatory to starting, if the weight in the car is just sufficient not to actuate the alarm, then the further pull caused upon the cable 3 by the additional effort due to the raising of the car, such additional weight will not cause the element 7 to operate. The indicator 6 may of course give this extra indication or not, as may be desired. The indicator 6 is provided with indicia 15 indicating the weight and is preferably operated by means of a flexible shaft 16 connected to a pinion 17 which is suitably mounted on a bridge 18. This bridge 18 and the associated cable connecting parts form a hitch structure as indicated in United States Letters Patent to Carl A. Anderson, #969,222 dated Sept. 6, 1910.

The car 1 has the upper cross pieces 19 which support the car and to these cross pieces the bridge 18 is secured. The cable or cables 3 by means of the link 20 are continued through the bridge 18 and are then flexibly associated with the said bridge through the agency of the spring 21, the washer 22 and nut 23. As before stated the pinion 17 is secured to some portion of the elevator car structure and a rack 24 is mounted at some portion of the cable, preferably the washer 22, so that this rack 24 by association with the pinion 17 causes a rotation of the flexible shaft 16 in accordance with the weight upon the car by virtue of the resilience of the spring 21.

It will thus be seen that the weight of the car is being continually indicated upon the indicator 6 and the contact 10 is so arranged that the alarm 7 will operate whenever this weight exceeds a predetermined amount. The additional effort or reduced effort on the cable caused by the raising or lowering of the car does not influence the proper indications as these indications are controlled preferably when the car is at a standstill, preferably by the doors 4 and 5 as set forth.

A simple system for preventing overloading of elevators is thus set forth. The indicator 6 of course may be of the recording type of device as is well understood.

Referring more particularly to Fig. 6, I show a simplified form in which the indicator may be eliminated but in which the circuit through the alarm 7 is controlled by the springs 25 and 26, spring 25 being preferably mounted on the bridge 18, and spring 26 being preferably carried by the bolt 23. The spring 25 is insulated as shown. The wires 11 and 12 may continue respectively to the controlling mechanism provided in connection with the doors as in the case of Fig. 1.

In Figs. 7 and 8, I have illustrated a controller 27 of the electric control variety commonly used in elevators and which has controlling wires leading from the source of current supply. The controller 27 has a handle 32 operating within a slot 28 by which the movement of the elevator is controlled. The dial 6 has the pointer 9 adapted to coöperate with the contact 10. The pinion 17 is secured to a second pinion 29 by means of the shaft 30. A rack 31 is secured to a rod 40 associated with the second rack 41. This second rack coöperates with the pinion 42 controlling the pointer 9. A magnet 43 is arranged serially with the battery 8 and alarm 7. This magneto drop has a shutter 44 having two arms 45, 45 as more clearly indicated in Fig. 8 and when this shutter arm falls down, as when drop 43 is energized, the arms 45 prevent movement of the handle 32. When current flows through coils of the drop 43 the armature 46 is attracted, thereby raising the arm 47 to permit the shutter 44 to fall.

It will thus be seen that when the weight is too great at starting, the alarm 7 sounds and the shutter 44 prevents the operator from moving the handle 32. Of course this control of the handle may also be effected without the coöperation of an audible alarm. After the handle 32 has been moved to operate the car, the arms 45 engage the brake of this handle 32 so that it is not stopped in an intermediate position. The operator may then restore the shutter manually or otherwise as may be desired.

Referring more particularly to Fig. 3, I have shown contacts 13ª and 14ª which are respectively analogous so far as the function they perform, as the contacts 13 and 14 of Fig. 1. Thus after the door has closed and no alarm has sounded, the first movement of the handle 32 breaks the alarm circuit, the same as the doors 4 and 5 would do.

In Fig. 4 I set forth a modification of the structure of Fig. 6 in which contacts 25ª and 26ª are used, contact 25ª being adjustable by means of the screw 33, and this adjustment of the contacts then be sealed by the inspector by inserting a wire with a seal through the head 34 of the screw 33 and the stationary plate 35. In this way the device is then safe against tampering.

In Fig. 5, I show a further modification, in which the bridge 18 is provided with a cup-shaped element 36 and a second coöperating cup-shaped element 37 is provided on the link 20. The union between these two elements 36 and 37 is air tight and the interior leads by means of the tube 8 to a pneumatic indicator 39, thus accomplishing by pneumatic means the same functions as accomplished electrically and set forth in Fig. 1.

As before stated I have described specifically several forms of carrying out my invention, but its varied application will be readily apparent.

Having thus described however, certain forms of carrying out my invention, what I claim as new and desire to secure by Letters Patent is:

1. In combination with a movable transporting platform, means for moving said platform, means for giving an indication when the weight on the said platform exceeds a predetermined amount, gates to control access to said platform, and means to prevent the said indication operable when said gates are in their access preventing position.

2. In combination with a movable transporting platform, means for moving said platform, means to indicate the weight carried by said platform, means for giving an indication operable when the weight on the said platform exceeds a predetermined amount, gates to control access to said platform, and means to prevent the said indication when said gates are in their access preventing position.

3. In combination with a weight carrying platform, means for moving said platform having resilient association with the said platform, means interposed between the said means and the said platform to give an indication when the weight of said platform exceeds a given predetermined amount, gates to control access to said platform, and means to prevent the said indication operable when said gates are in their access preventing position.

4. In combination with a weight carrying platform, means for moving said platform having resilient association with the said platform, means interposed between the said means and the said platform to control an indicator for indicating the weight carried by said platform and to give an indication when the weight of said platform exceeds a given predetermined amount, gates to control access to said platform, and means to prevent the said indication operable when said gates are in their access preventing position.

5. In combination with a movable transporting platform, means for moving said platform, means for giving an indication when the weight on the said platform exceeds a predetermined amount, and means to at times prevent the said indication, said last aforesaid means comprising a door and controlling devices under the control of said door.

6. In combination with a movable transporting platform, means for moving said platform, means to indicate the weight carried by said platform, means for giving an indication when the weight on the said platform exceeds a predetermined amount, and means to at times prevent the said indication, said last aforesaid means comprising a door and controlling devices under the control of said door.

7. In combination with a weight carrying platform, means for moving said platform having resilient association with the said platform, means interposed between the said means and the said platform to give an indication when the weight of said platform exceeds a given predetermined amount, and means to at times prevent the said indication, said last aforesaid means comprising a door and controlling devices under the control of said door.

8. In combination with a weight carrying platform, means for moving said platform having resilient association with the said platform, means interposed between the said means and the said platform to control an indicator for indicating the weight carried by said platform and to give an indication when the weight of said platform exceeds a given predetermined amount, and means to at times prevent the said indication, said last aforesaid means comprising a door and controlling devices under the control of said door.

9. In combination with a movable transporting platform, means for moving said platform, means for giving an indication when the weight on the said platform exceeds a predetermined amount, gates to control access to said platform, and means operable by said gates to prevent the said indication when said gates are in their access preventing position.

In witness whereof, I hereunto subscribed my name this 19th day of October, A. D. 1911.

JOHN C. A. ANDERSON.

Witnesses:
A. S. DENNISON,
HAZEL JONES.